(12) United States Patent
Mohan et al.

(10) Patent No.: US 11,379,861 B2
(45) Date of Patent: Jul. 5, 2022

(54) CLASSIFYING POST TYPES ON ONLINE SOCIAL NETWORKS

(71) Applicant: Meta Platforms, Inc., Menlo Park, CA (US)

(72) Inventors: Vandana Mohan, Seattle, WA (US); Halil Bayrak, San Jose, CA (US); Mridul Malpani, Mountain View, CA (US); Vinay Ramesh Jain, Sunnyvale, CA (US); Eric Gaudet, San Jose, CA (US); Shashikant Khandelwal, Mountain View, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 689 days.

(21) Appl. No.: 15/596,368

(22) Filed: May 16, 2017

(65) Prior Publication Data
US 2018/0336574 A1    Nov. 22, 2018

(51) Int. Cl.
*G06Q 30/02* (2012.01)
*G06Q 50/00* (2012.01)
*G06N 20/00* (2019.01)
*G06F 16/958* (2019.01)

(52) U.S. Cl.
CPC ....... *G06Q 30/0201* (2013.01); *G06F 16/986* (2019.01); *G06N 20/00* (2019.01); *G06Q 50/01* (2013.01)

(58) Field of Classification Search
CPC .. G06Q 30/0201; G06Q 50/01; G06F 16/986; G06N 20/00
USPC ...................................................... 705/7.29
See application file for complete search history.

(56) References Cited

U.S. PATENT DOCUMENTS

| | | | |
|---|---|---|---|
| 5,918,014 A | 6/1999 | Robinson |
| 6,539,232 B2 | 3/2003 | Hendrey |
| 6,957,184 B2 | 10/2005 | Schmid |
| 7,069,308 B2 | 6/2006 | Abrams |

(Continued)

OTHER PUBLICATIONS

"In-Depth Survey of Digital Advertising Technologies", Chen, 2016 (Year: 2016).*

(Continued)

*Primary Examiner* — Charles Guiliano
*Assistant Examiner* — Po Han Lee
(74) *Attorney, Agent, or Firm* — Baker Botts L.L.P.

(57) ABSTRACT

A method is disclosed which includes: receiving, from a third-party content provider, a link to a structured document on an external server, where the link is associated with a post of the online social network by the third-party content provider, and retrieving the structured document from the external server, where the structured document includes content and input fields. This step is followed by extracting a predefined set of information from the structured document about the content and input fields of the structured document. The extracted set of information from the structured document are then evaluated to determine one or more feature-values of the structured document. A machine learning model is used to classify the structured document as an external lead-generation type page based on the one or more feature-values of the structured document and a notification is sent to the third-party content provider if the structured document is classified as an external lead-generation type page.

18 Claims, 12 Drawing Sheets

(56) References Cited

U.S. PATENT DOCUMENTS

| | | |
|---|---|---|
| 7,379,811 B2 | 5/2008 | Rasmussen |
| 7,539,697 B1 | 5/2009 | Akella |
| 7,752,326 B2 | 7/2010 | Smit |
| 7,783,630 B1 | 8/2010 | Chevalier |
| 7,797,635 B1 | 9/2010 | Denise |
| 7,836,044 B2 | 11/2010 | Kamvar |
| 7,840,589 B1 | 11/2010 | Holt |
| 8,024,328 B2 | 9/2011 | Dolin |
| 8,027,990 B1 | 9/2011 | Mysen |
| 8,055,673 B2 | 11/2011 | Churchill |
| 8,060,639 B2 | 11/2011 | Smit |
| 8,082,278 B2 | 12/2011 | Agrawal |
| 8,112,529 B2 | 2/2012 | Van Den Oord |
| 8,135,721 B2 | 3/2012 | Joshi |
| 8,145,636 B1 | 3/2012 | Jeh |
| 8,180,804 B1 | 5/2012 | Narayanan |
| 8,185,558 B1 | 5/2012 | Narayanan |
| 8,209,330 B1 | 6/2012 | Covell |
| 8,239,364 B2 | 8/2012 | Wable |
| 8,244,848 B1 | 8/2012 | Narayanan |
| 8,271,471 B1 | 9/2012 | Kamvar |
| 8,271,546 B2 | 9/2012 | Gibbs |
| 8,301,639 B1 | 10/2012 | Myllymaki |
| 8,306,922 B1 | 11/2012 | Kunal |
| 8,312,056 B1 | 11/2012 | Peng |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,572,129 B1 | 10/2013 | Lee |
| 8,578,274 B2 | 11/2013 | Druzgalski |
| 8,595,297 B2 | 11/2013 | Marcucci |
| 8,601,027 B2 | 12/2013 | Behforooz |
| 8,606,721 B1 | 12/2013 | Dicker |
| 8,639,725 B1 | 1/2014 | Udeshi |
| 8,700,543 B2 * | 4/2014 | Glickman .......... G06Q 30/0201 706/12 |
| 8,732,208 B2 | 5/2014 | Lee |
| 8,751,521 B2 | 6/2014 | Lee |
| 8,775,324 B2 | 7/2014 | Zhu |
| 8,782,080 B2 | 7/2014 | Lee |
| 8,782,753 B2 | 7/2014 | Lunt |
| 8,832,111 B2 | 9/2014 | Venkataramani |
| 8,868,590 B1 | 10/2014 | Donneau-Golencer |
| 8,868,603 B2 | 10/2014 | Lee |
| 8,898,226 B2 | 11/2014 | Tiu |
| 8,909,637 B2 | 12/2014 | Patterson |
| 8,914,392 B2 | 12/2014 | Lunt |
| 8,918,418 B2 | 12/2014 | Lee |
| 8,924,406 B2 | 12/2014 | Lunt |
| 8,935,255 B2 | 1/2015 | Sankar |
| 8,935,261 B2 | 1/2015 | Pipegrass |
| 8,935,271 B2 | 1/2015 | Lassen |
| 8,949,232 B2 | 2/2015 | Harrington |
| 8,949,250 B1 | 2/2015 | Garg |
| 8,949,261 B2 | 2/2015 | Lunt |
| 8,954,675 B2 | 2/2015 | Venkataramani |
| 8,983,991 B2 | 3/2015 | Sankar |
| 9,065,793 B2 * | 6/2015 | Gleadall ............. H04L 67/2847 |
| 2002/0059199 A1 | 5/2002 | Harvey |
| 2002/0086676 A1 | 7/2002 | Hendrey |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0215793 A1 | 10/2004 | Ryan |
| 2004/0243568 A1 | 12/2004 | Wang |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0041597 A1 | 2/2006 | Conrad |
| 2006/0117378 A1 | 6/2006 | Tam |
| 2006/0136419 A1 | 6/2006 | Brydon |
| 2006/0190436 A1 | 8/2006 | Richardson |
| 2006/0218111 A1 | 9/2006 | Cohen |
| 2007/0174304 A1 | 7/2007 | Shrufi |
| 2007/0192293 A1 | 8/2007 | Swen |
| 2007/0277100 A1 | 11/2007 | Sheha |
| 2008/0005064 A1 | 1/2008 | Sarukkai |
| 2008/0033926 A1 | 2/2008 | Matthews |
| 2008/0072180 A1 | 3/2008 | Chevalier |
| 2008/0114730 A1 | 5/2008 | Larimore |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0054043 A1 | 2/2009 | Hamilton |
| 2009/0094200 A1 | 4/2009 | Baeza-Yates |
| 2009/0164408 A1 | 6/2009 | Grigorik |
| 2009/0164431 A1 | 6/2009 | Zivkovic |
| 2009/0164929 A1 | 6/2009 | Chen |
| 2009/0197681 A1 | 8/2009 | Krishnamoorthy |
| 2009/0222348 A1 | 9/2009 | Ransom |
| 2009/0228296 A1 | 9/2009 | Ismalon |
| 2009/0259624 A1 | 10/2009 | DeMaris |
| 2009/0259646 A1 | 10/2009 | Fujita |
| 2009/0265326 A1 | 10/2009 | Lehrman |
| 2009/0271370 A1 | 10/2009 | Jagadish |
| 2009/0271374 A1 | 10/2009 | Korn |
| 2009/0276414 A1 | 11/2009 | Gao |
| 2009/0281988 A1 | 11/2009 | Yoo |
| 2009/0299963 A1 | 12/2009 | Pippori |
| 2010/0049802 A1 | 2/2010 | Raman |
| 2010/0057723 A1 | 3/2010 | Rajaram |
| 2010/0082695 A1 | 4/2010 | Hardt |
| 2010/0125562 A1 | 5/2010 | Nair |
| 2010/0145771 A1 | 6/2010 | Fligler |
| 2010/0179929 A1 | 7/2010 | Yin |
| 2010/0197318 A1 | 8/2010 | Petersen |
| 2010/0228744 A1 | 9/2010 | Craswell |
| 2010/0235354 A1 | 9/2010 | Gargaro |
| 2010/0250526 A1 | 9/2010 | Prochazka |
| 2010/0321399 A1 | 12/2010 | Ellren |
| 2011/0004609 A1 | 1/2011 | Chitiveli |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0184981 A1 | 7/2011 | Lu |
| 2011/0191371 A1 | 8/2011 | Elliott |
| 2011/0196855 A1 | 8/2011 | Wable |
| 2011/0213655 A1 * | 9/2011 | Henkin .................. G06Q 30/00 705/14.49 |
| 2011/0231296 A1 | 9/2011 | Gross |
| 2011/0276396 A1 | 11/2011 | Rathod |
| 2011/0313992 A1 | 12/2011 | Groeneveld |
| 2011/0320470 A1 | 12/2011 | Williams |
| 2012/0042020 A1 | 2/2012 | Kolari |
| 2012/0047147 A1 | 2/2012 | Redstone |
| 2012/0059708 A1 | 3/2012 | Galas |
| 2012/0110080 A1 | 5/2012 | Panyam |
| 2012/0136852 A1 | 5/2012 | Geller |
| 2012/0166432 A1 | 6/2012 | Tseng |
| 2012/0166433 A1 | 6/2012 | Tseng |
| 2012/0179637 A1 | 7/2012 | Juan |
| 2012/0185472 A1 | 7/2012 | Ahmed |
| 2012/0185486 A1 | 7/2012 | Voigt |
| 2012/0209832 A1 | 8/2012 | Neystadt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0290950 A1 | 11/2012 | Rapaport |
| 2012/0310922 A1 | 12/2012 | Johnson |
| 2012/0311034 A1 | 12/2012 | Goldband |
| 2012/0317088 A1 | 12/2012 | Pantel |
| 2012/0331063 A1 | 12/2012 | Rajaram |
| 2013/0031106 A1 | 1/2013 | Schechter |

(56) References Cited

U.S. PATENT DOCUMENTS

| | | |
|---|---|---|
| 2013/0031113 A1 | 1/2013 | Feng |
| 2013/0041876 A1 | 2/2013 | Dow |
| 2013/0066876 A1 | 3/2013 | Raskino |
| 2013/0073400 A1 | 3/2013 | Heath |
| 2013/0085970 A1 | 4/2013 | Karnik |
| 2013/0086024 A1 | 4/2013 | Liu |
| 2013/0086057 A1 | 4/2013 | Harrington |
| 2013/0097140 A1 | 4/2013 | Scheel |
| 2013/0124538 A1 | 5/2013 | Lee |
| 2013/0124542 A1 | 5/2013 | Lee |
| 2013/0144899 A1 | 6/2013 | Lee |
| 2013/0191372 A1 | 7/2013 | Lee |
| 2013/0191416 A1 | 7/2013 | Lee |
| 2013/0198219 A1 | 8/2013 | Cohen |
| 2013/0204737 A1 | 8/2013 | Agarwal |
| 2013/0226918 A1 | 8/2013 | Berkhim |
| 2013/0227011 A1 | 8/2013 | Sharma |
| 2013/0246404 A1 | 9/2013 | Annau |
| 2013/0254155 A1 | 9/2013 | Thollot |
| 2013/0254305 A1 | 9/2013 | Cheng |
| 2014/0006416 A1 | 1/2014 | Leslie |
| 2014/0067535 A1 | 3/2014 | Rezaei |
| 2014/0122465 A1 | 5/2014 | Bilinski |
| 2014/0180788 A1* | 6/2014 | George .............. G06Q 30/0269 705/14.41 |
| 2014/0280080 A1 | 9/2014 | Solheim |
| 2014/0304429 A1 | 10/2014 | Softky |
| 2015/0074289 A1 | 3/2015 | Hyman |
| 2015/0088593 A1* | 3/2015 | Raghunathan ..... G06Q 10/0633 705/7.27 |
| 2015/0127565 A1* | 5/2015 | Chevalier .............. G06Q 10/00 705/319 |
| 2015/0161519 A1 | 6/2015 | Zhong |
| 2015/0248484 A1* | 9/2015 | Yu ......................... G06Q 30/02 707/711 |
| 2015/0254555 A1* | 9/2015 | Williams, Jr. ....... G06N 3/0454 706/14 |
| 2015/0286643 A1 | 10/2015 | Kumar |
| 2015/0363402 A1 | 12/2015 | Jackson |
| 2016/0026727 A1 | 1/2016 | Bar-Yossef |
| 2016/0041982 A1 | 2/2016 | He |
| 2016/0042067 A1 | 2/2016 | Weng |
| 2016/0063093 A1 | 3/2016 | Boucher |
| 2016/0063115 A1 | 3/2016 | Ayan |
| 2016/0162502 A1 | 6/2016 | Zhou |
| 2016/0203238 A1 | 7/2016 | Cherniavskii |
| 2016/0350422 A1* | 12/2016 | Abrahami ........... G06F 17/2247 |
| 2017/0046739 A1* | 2/2017 | Barak ................... G06Q 30/02 |
| 2017/0147534 A1* | 5/2017 | Sethuraman ......... G06F 17/211 |

OTHER PUBLICATIONS

U.S. Appl. No. 15/358,943, filed Nov. 22, 2016, Saxena.
U.S. Appl. No. 15/463,751, filed Mar. 20, 2017, Parepally.

* cited by examiner

CLASSIFYING POST TYPES ON ONLINE SOCIAL NETWORKS

TECHNICAL FIELD

This disclosure generally relates to online social networks and classifying content within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

The social-networking systems have provided a platform for users to share various types of content. For example, business users (or other types of third-party content providers) may use the online social network for lead-generation purposes (e.g., for identifying potential customers or "leads"). The business users may post advertisements on the online social network with links to an external interface (e.g., an external webpage on a third-party server) that is a lead-generation page that includes input fields where a user can input his or her contact or personal information, e.g., full name, email address, date of birth, etc., allowing the business user or its partners to subsequently contact the user to with offers for goods or services.

SUMMARY OF PARTICULAR EMBODIMENTS

In particular embodiments, the social-networking system may use machine learning to automatically analyze external structured documents on an external server (e.g., external webpages on a web server of the third-party content provider) linked to by internal posts on the online social network that have been posted by a third-party content provider. A machine-learning model may be trained for classifying external structured documents as being lead-generation type pages or non-lead-generation type pages. The trained machine-learning model may retrieve the structured document linked to by each post (e.g., an external webpage linked to by the post) and extract the information about the input fields and content of the structured document. By calculating a confidence score for the external structured document linked to by the post based on the feature-values of the structured document and comparing the score with a threshold, the machine-learning model may predict whether the external structured document is for generating leads (e.g., includes input fields where the user can input their contact or personal information, such as their name, email address, date of birth, etc.), and thus classify the external structured document as an "external lead-generation type page," or whether the external structured document is another type of external structured document (e.g., an authentication page, a search page, a page with multimedia content, etc.), and thus classify the external structured document as an "external non-lead-generation type page." If the external structured document is classified as an external lead-generation type page, then the social-networking system may send a notification to the third-party content provider, which may include, for example, a link to an interface for creating an internal lead-generation type post, which may be referred to as a "native lead-generation type post" (i.e., an internal post on the online social network with input fields where a user can input their contact or personal information, such as their name, email address, date of birth, etc., in order to share that information, via the social-networking system, with the third-party content provider). The interface may be a tool for creating native lead-generation type posts (e.g., a post composer customized for making lead-generation type posts), or may be a pre-generated native lead-generation type post created by the social-networking system based on an analysis of the external structured document (which may have been classified as an external lead-generation type page) linked to by the post of the third-party content provider. The interface may allow the third-party content provider to create new native lead-generation type posts or modify existing native lead-generation type posts. External structured documents for collecting lead-generation information may present technical challenges in terms of quickly and accurately collecting user information, since users are resistant to input information into forms. The use of native lead-generation type posts may improve the lead-generation process by increasing the accuracy and speed of acquiring such information, since it can reduce or eliminate the need for the users to manually supply information. When accessing a native lead-generation type post, the social-networking system may pre-populate the user's information into the input fields, and the user may only need to confirm that the pre-populated fields are correct, fill in any unpopulated fields, and submit the information, which may then be sent to the third-party content provider. Pre-population of user information reduces friction in the information-collection flow, which improves conversion rates for third-party content providers. This also provides a technical solution to the problem of hosting webpages or creating applications for collecting customer information, since the use of native lead-generation type posts may allow third-party content providers to eliminate these types of webpages and applications. Therefore, classifying the external structured document linked to by posts based on the intent of the third-party content provider, e.g., lead-generation page or non-lead-generation page, to create native lead-generation posts may allow the online social network to tailor its services to better meet the needs of its business users. Also, the use of native lead-generation type posts may improve the security of the lead-generation process by relying on the authorization/privacy server of the social-networking system, which may allow the user to input their own privacy settings and thus control what information is shared with the third-party content provider and eliminate any security problems raised by interacting with third-party webpages or applications.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
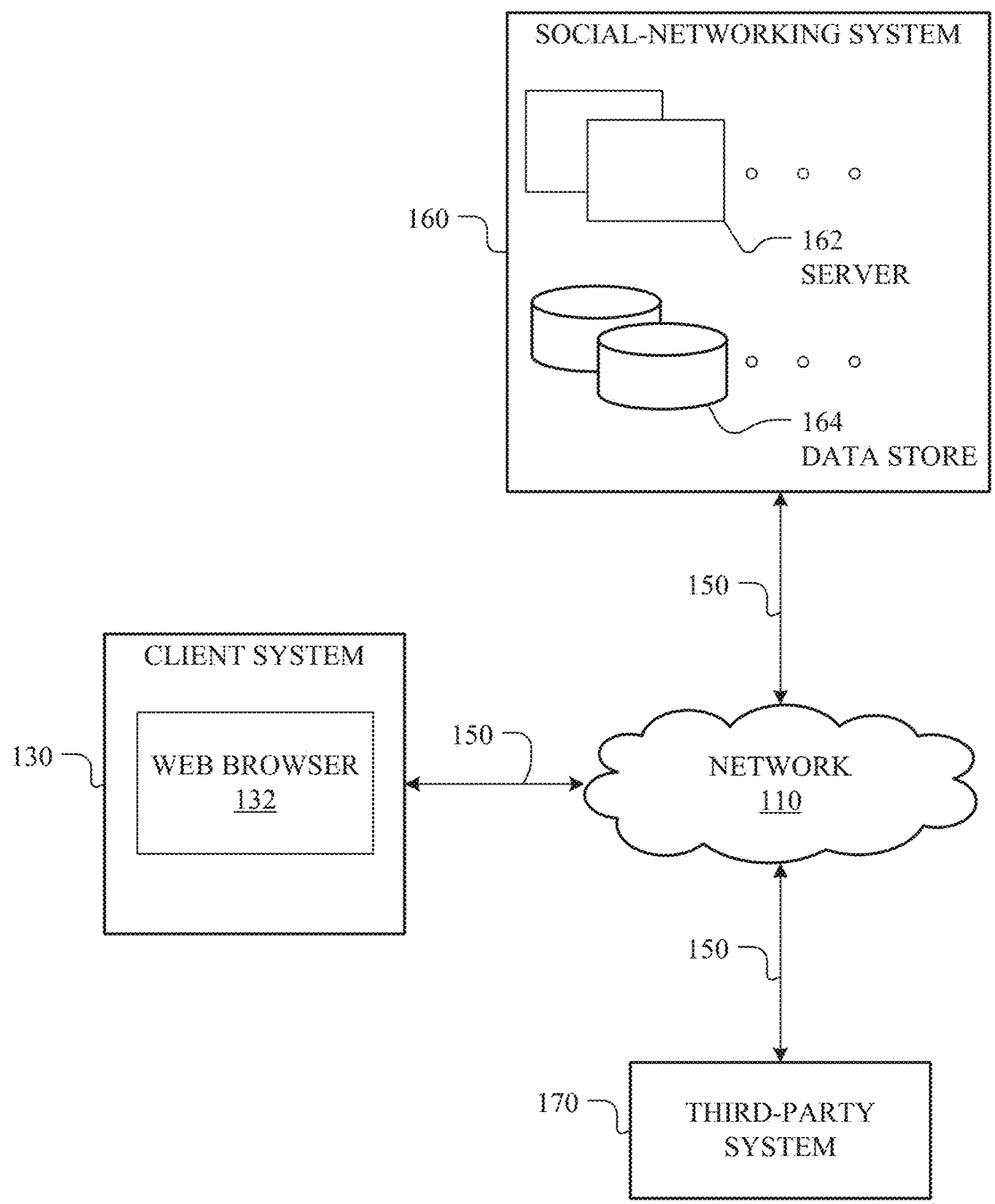
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
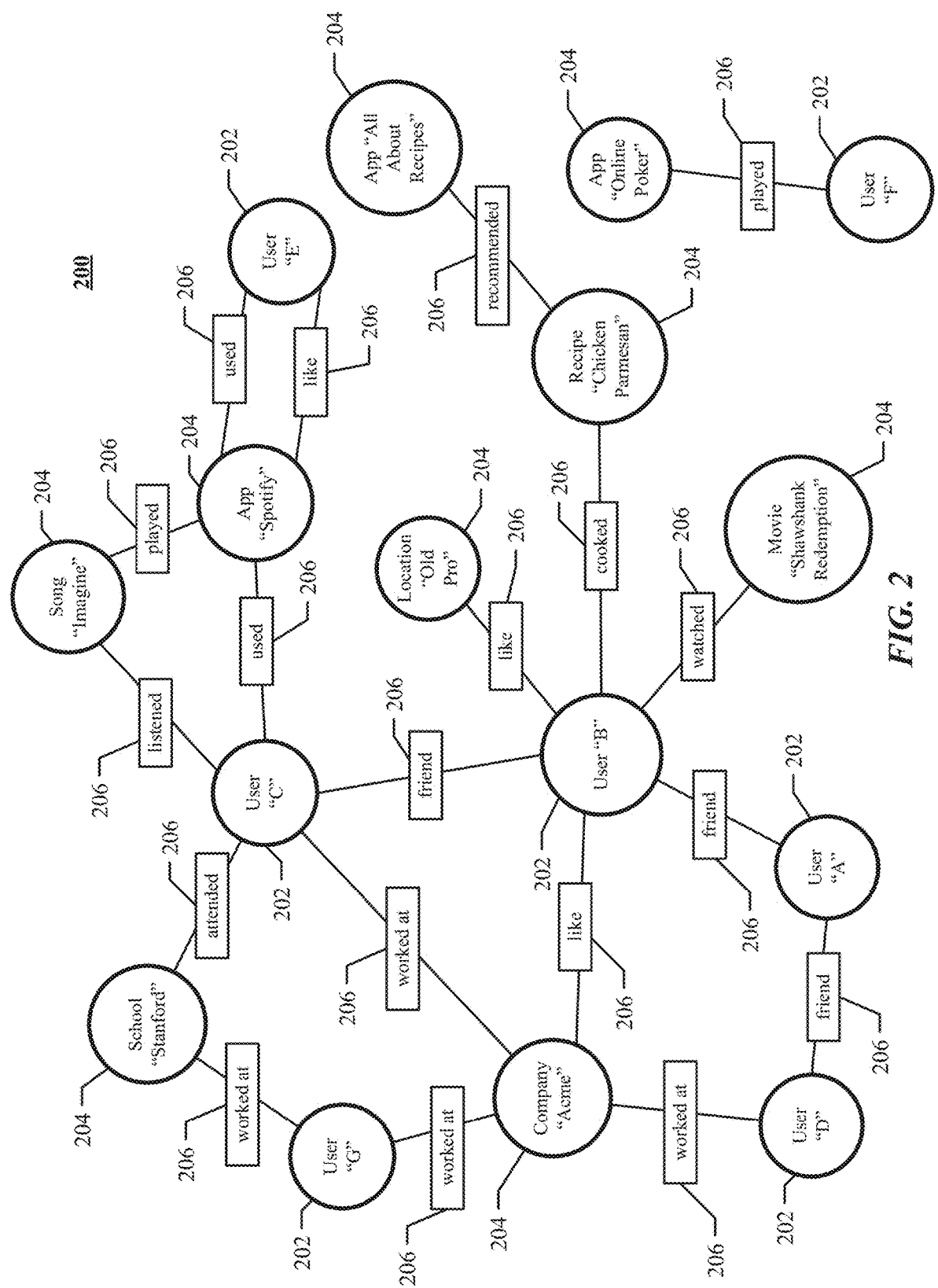
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more web interfaces.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more web interfaces.

In particular embodiments, a node in the social graph 200 may represent or be represented by a web interface (which may be referred to as a "profile interface"). Profile interfaces may be hosted by or accessible to the social-networking system 160. Profile interfaces may also be hosted on third-party websites associated with a third-party system 170. As an example and not by way of limitation, a profile interface corresponding to a particular external web interface may be the particular external web interface and the profile interface may correspond to a particular concept node 204. Profile interfaces may be viewable by all or a selected subset of other users. As an example and not by way of limitation, a user node 202 may have a corresponding user-profile interface in which the corresponding user may add content, make declarations, or otherwise express himself or herself. As another example and not by way of limitation, a concept node 204 may have a corresponding concept-profile interface in which one or more users may add content, make declarations, or express themselves, particularly in relation to the concept corresponding to concept node 204.

In particular embodiments, a concept node 204 may represent a third-party web interface or resource hosted by a third-party system 170. The third-party web interface or resource may include, among other elements, content, a selectable or other icon, or other interactable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party web interface or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or a subtype. A concept-profile interface corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in the social graph 200. As an example and not by way of limitation, a user viewing a concept-profile interface (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile interface. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Classifying Post Types on Online Social Networks

In particular embodiments, the social-networking system 160 may use machine learning to automatically analyze external structured documents on an external server (e.g., external webpages on a web server of the third-party content provider) linked to by internal posts on the online social network that have been posted by a third-party content provider. A machine-learning model may be trained for classifying external structured documents as being lead-generation type pages or non-lead-generation type pages. The trained machine-learning model may retrieve the structured document linked to by each post (e.g., an external webpage linked to by the post) and extract the information about the input fields and content of the structured document. By calculating a confidence score for the external structured document linked to by the post based on the feature-values of the structured document and comparing the score with a threshold, the machine-learning model may predict whether the external structured document is for generating leads (e.g., includes input fields where the user can input their contact or personal information, such as their name, email address, date of birth, etc.), and thus classify the external structured document as an "external lead-generation type page," or whether the external structured document is another type of external structured document (e.g., an authentication page, a search page, a page with multimedia content, etc.), and thus classify the external structured document as an "external non-lead-generation type page." If the external structured document is classified as an external lead-generation type page, then the social-networking system 160 may send a notification to the third-party content provider, which may include, for example, a link to an interface for creating an internal lead-generation type post, which may be referred to as "native lead-generation type post" (i.e., an internal post on the online social network with input fields where a user can input their contact or personal information, such as their name, email address, date of birth, etc., in order to share that information, via the social-networking system 160, with the third-party content provider). The interface may be a tool for creating a native lead-generation type post (e.g., a post composer customized for making lead-generation type posts), or may be a pre-generated native lead-generation type post created by the social-networking system 160 based on an analysis of the external structured document (which may have been classified as an external lead-generation type page) linked to by the post of the third-party content provider. The interface may allow the third-party content provider to create new native lead-generation type posts or modify existing native lead-generation type posts. External structured documents for collecting lead-generation information may present technical challenges in terms of quickly and accurately collecting user information, since users are resistant to input information into forms. The use of native lead-generation type posts may improve the lead-generation process by increasing the accuracy and speed of acquiring such information, since it can reduce or eliminate the need for the users to manually supply information. When accessing a native lead-generation type post, the social-networking system 160 may pre-populate the user's information into the input fields, and the user may only need to confirm that the pre-populated fields are correct, fill in any unpopulated fields, and submit the information, which may then be sent to the third-party content provider. Pre-population of user information may reduce friction in the information-collection flow, which may improve conversion rates for third-party content providers. This also may provide a technical solution to the problem of hosting webpages or creating applications for collecting customer information, since the use of native lead-generation type posts may allow third-party content providers to eliminate these types of webpages and applications. Therefore, classifying the external structured document linked to by posts based on the intent of the third-party content provider, e.g., lead-generation page or non-lead-generation page, to create native lead-generation posts may allow the online social network to tailor its services to better meet the needs of its business users. Also, the use of native lead-generation type posts may improve the security of the lead-generation process by relying on the authorization/privacy server of the social-networking system 160, which may allow the user to input their own privacy settings and thus control what information is shared with the third-party content provider and eliminate any security problems raised by interacting with third-party webpages or applications.

In particular embodiments, the social-networking system 160 may use a machine-learning model to determine if a structured document linked to by a post of the online social network is being used in particular manners of interest (e.g., lead-generation or non-lead-generation). For example, a machine-learning model may be trained to analyze information associated with an external structured document and predict whether the external structured document belongs to a particular predetermined category. An example machine-learning process may include extracting feature values from: (1) a training set of external structured documents linked to by internal posts known to belong to a first type of structured document and (2) a training set of external structured documents linked to by internal posts known to belong to a second type of structured document. The extracted features and their association with known type of external structured document may be used to train a machine-learning prediction model. Once trained, the machine-learning model may be used to analyze similarly extracted feature values from an external structured document of unknown usage type and predict how the external structured document linked to by a particular post should be classified.

In online marketing, generation of prospective consumer interest or enquiry into products or services of a third-party content provider, referred to as "lead generation," may be initiated by posting lead-generation type posts on an online social network. The lead-generation type posts may be generated for a variety of purposes, e.g., list building, e-newsletter list acquisition, building out rewards programs, loyalty programs, or for other member acquisition programs. In general, lead-generation type posts may be used for soliciting user information, such as name, email address, and phone number. Lead-generation type posts that are generated by and displayed through the social-networking system 160 (hereinafter native lead-generation type posts) may be capable of being "pre-populated" with the viewing user's social-networking information (e.g., an input field may be automatically filled with a user's name and email address, which may be accessed by the social-networking system 160 from the user's profile information on the online social network). However, some third-party content providers may create their own lead-generation type posts (hereinafter external lead-generation type posts), which are posts on the online social network that link to structured documents on external servers associated with the third-party content provider (e.g., external webpages).

One benefit of using machine-learning to automatically detect which external structured documents on the online social network are external lead-generation type structured documents is that the social-networking system 160 would not have to rely on third-party content providers correctly identifying the intent of their post as being a lead generation type post or a non-lead-generation type post. As an example and not by way of limitation, a user clicking on a lead-generation type post on the online social network by an auto-dealer would be directed to the auto-dealer's external lead-generation type interface, which may be hosted by an external server. Since the auto-dealer's external lead-generation type interface is not on the internal server of the social-networking system 160, the input fields cannot be pre-populated with the user's data stored on the social-networking system 160. As another example and not by way of limitation, a third-party content provider may use a native lead-generation type post on the social-networking system 160, where the required input fields may include the user's name and email address. In this case, the input fields of the native lead-generation type post associated with the third-party content provider may be pre-populated with the viewing user's name and email address stored in the online social-networking system 160 and the user may only have to confirm the pre-populated information. In particular embodiments, the social-networking system 160 may determine the external structured document associated with a post as being a non-lead-generation type page, in which case the social-networking system 160 may not proceed with generating a native lead-generation type post. As an example and not by way of limitation, the social-networking system 160 may determine the external structured document as being a web interface with only multimedia content. As another example and not by way of limitation, the social-networking system 160 may determine the external structured document as being an authentication web interface (e.g., a login page for accessing the third-party system 170). Although this disclosure describes detecting external lead-generation type pages and creating native lead-generation type posts in a particular manner, this disclosure contemplates detecting external lead-generation type pages and creating native lead-generation type posts in any suitable manner.

In particular embodiments, the social-networking system 160 may receive, from a third-party content provider, a link to a structured document on an external server, where the link may be associated with a post of the online social network by the third-party content provider; (e.g., a link to an external webpage on a third-party web site). Clicking on the post may direct the user from the online social network to the external server. As an example and not by way of limitation, the third-party content provider may be an individual user, an account manager, an automated bot, or another suitable entity associated with the third-party content provider responsible for posting the post on the online social network. In particular embodiments, the social-networking system 160 may access the external structured document linked to by a post of the online social network in real-time, responsive to the post being posted on the online social network by a third-party content provider. Alternatively, the social-networking system 160 may access the external structured document linked to by a posts offline e.g., via a batch process. As an example and not by way of limitation, the social-networking system 160 may access the structured documents linked to by posts of the online social network after 10,000 posts, 100,000 posts, or after other suitable numbers of posts. Furthermore, the social-networking system 160 may access the structured documents linked to by posts by the third-party content providers periodically. As an example and not by way of limitation, the social-networking system 160 may access the structured documents on the external servers every hour, every 24 hours, or at other suitable predefined periods of time. Although this disclosure describes accessing particular posts and structured documents in a particular manner, this disclosure contemplates accessing any suitable posts and structured documents in any suitable manner.

In particular embodiments, the social-networking system 160 may retrieve the structured document from the external server associated with the third-party content provider (e.g., from a third-party system 170). The retrieved structured document from the external server may include content and input fields. As an example and not by way of limitation, the retrieved structured document may be a lead-generation interface, which may contain input fields where a user can input their contact or personal information, e.g., full name, email address, date of birth, etc. As another example and not by way of limitation, the retrieved structured document may be an authentication web interface, such as a login page for accessing the third-party system 170, which may contain input fields for inputting a username and password (or other suitable authentication credentials). As yet another example and not by way of limitation, the retrieved structured document may be a web search engine web interface (e.g., with a query input field) or a web interface with only multimedia content (e.g., a news article, a video advertisement, etc.). Although this disclosure describes retrieving particular structured documents in a particular manner, this disclosure contemplates retrieving any suitable structured documents in any suitable manner.

In particular embodiments, the social-networking system 160 may extract a predefined set of information from the structured document about the content and input fields of the structured document. The types of information included in the predefined set of information may be determined by a machine-learning model, as described in more detail below. In particular embodiments, a document object model (DOM) may be extracted for a structured document. The DOM is a hierarchical tree-based data structure that represents each element of the structured document as a "node." In particular embodiments, a predefined set of information about the content and input fields may include DOM nodes or structured document elements and their associated metadata that represent a portion of a structured document. As an example and not by way of imitation, the predefined set of information including the number of input fields, whether there is a submit button, whether certain keywords (e.g., "firs name") appear close to input fields and whether certain negative indicators (e.g., password) exist within the structured document may be extracted from the structured document. In particular embodiments, the social-networking system 160 may extract all or any number of the input fields and the content from the structured document. Although this disclosure describes extracting particular information from structured documents in a particular manner, this disclosure contemplates extracting any suitable information from structured documents in any suitable manner.

In particular embodiments, the social-networking system 160 may evaluate the extracted set of information from the structured document to determine one or more feature-values of the structured document. A feature-value is essentially a count of a particular type of feature of the structured document. The one or more feature-values of the structured document may include, but are not limited to:

the structured document uses a POST or GET request method;
total number of fields in the structured document;
total number of fields in the structured document that are not hidden (i.e., visible to the user, and thus can be selected and/or edited);
total number of relevant fields in the form (e.g., a relevant field includes those listed above, and may be measured with respect to the number of non-relevant fields);
number of fields type SELECT (e.g., dropdown lists);
number of fields type RADIO (i.e., buttons used to allow users to select one item at a time);
number of fields type CHECKBOX (i.e., buttons used to allow users to select one or more options from a set);
number of fields type EMAIL;
number of fields type PASSWORD;
number of fields type SEARCH (i.e., a box to allow users to enter a query);
number of fields type TEL (i.e., an input field to enter user's telephone number);
number of fields type URL (i.e., an address associated with an web interface);
number of fields type RESET (i.e., a box to allow user to clear other boxes to re-enter data);
number of fields type TEXT (i.e., a box to allow user to enter text);
number of fields type TEXTAREA (i.e., a multi-line text input);
number of fields type SUBMIT buttons (i.e., a box to allow user to submit the information);
total number of options in SELECT fields;
total number of options in RADIO fields;
form has string "First Name" in the text associated with one of the fields;
form has string "Last Name" in the text associated with one of the fields;
form has string "Full Name" in the text associated with one of the fields;
form has string "Email" in the text associated with one of the fields;
form has string "Phone" in the text associated with one of the fields;
form has string "Address" in the text associated with one of the fields;
form has string "CCV" in the text associated with one of the fields;
form has string "Agree" in the text associated with one of the fields;
total number of words in the structured document; or
total number of html elements in the structured document.

Although this disclosure describes evaluating particular features and feature-values of a structured document in a particular manner, this disclosure contemplates evaluating any suitable features and feature-values of a structured document in any suitable manner.

In particular embodiments, the social-networking system 160 may categorize the feature as being positive or negative signals with respect to classifying the external structured document as an external lead-generation type page or an external non-lead-generation type page. The types of features that are more commonly used in lead-generation type pages may be categorized as positive signals when making this classification, and the types of features that are less commonly used in lead-generation type pages or more commonly used in non-lead-generation type pages may be categorized as negative signals when making this classification. As an example and not by way of limitation, the total number of relevant input fields, number of input fields type CHECKBOX, number of input fields type EMAIL, number of input fields type TEL, total number of input options in SELECT input fields, the string "First Name" in the text associated with one of the input fields, the string "Last Name" in the text associated with one of the input fields, the string "Full Name" in the text associated with one of the input fields, the string "Email" in the text associated with one of the input fields, the string "Phone" in the text associated with one of the input fields, the string "Address" in the text associated with one of the input fields may be categorized as positive signals by the social-networking system 160, as being commonly used types of input fields and content in the lead-generation type pages by the third-party content providers. As another example and not by way of limitation, number of input fields type PASSWORD, number of input fields type SEARCH, number of input fields type URL, the string "CCV" in the text associated with one of the input fields may be categorized as negative by the social-networking system 160, as being commonly used input fields and content in non-lead-generation type pages by the third-party content providers. Although this disclosure describes categorizing particular features of a structured document in a particular manner, this disclosure contemplates categorizing any suitable features of a structured document in any suitable manner.

In particular embodiments, the social-networking system 160 may classify, using a machine-learning model (which we may refer to as a classifier), the external structured document as an external lead-generation type page based on the one or more feature-values of the structured document. The machine-learning model may calculate a confidence score for the external structured document based on the feature-values of the structured document. Following the calculation of the confidence score, the machine-learning model may classify the external structured document as being a lead-generation type page or a non-lead-generation type page, in which if the calculated confidence score is greater than a predefined threshold score, then the external structured document may be classified as being a lead-generation type page. In this case, the social-networking system 160 may send, to the third-party content provider, a notification that the external structured document is classified as an external lead-generation type page. Similarly, the learning-machine model may determine the external structured document as being a non-lead-generation page if the confidence score is less than the predefined threshold. In this case, the social-networking system 160 may not proceed with sending a notification to the third-party content provider. As an example and not by way of limitation, the social-networking system 160 may calculate a confidence score above the predefined threshold and classify the external structured document as being a lead-generation type page, based on the feature-values of the structured document, in which the features include: user's name, email address and date of birth. As another example and not by way of limitation, the social-networking system 160 may classify an external structured document as being a non-lead-generation type page, if the structured document includes password and credit card information of the user as the input fields. Although this disclosure describes classifying particular structured documents in a particular manner, this disclosure contemplates classifying any suitable structured documents in any suitable manner.

In particular embodiments the social-networking system 160 may train a machine-learning model, using the features extracted from the structured document, to automatically classify the external structured documents as being lead-generation type pages or non-lead-generation type pages. Training of the machine-learning model may be done using supervised learning techniques, where training examples are provided, and where each example is a pair consisting of an input object (a post of the online social network and the external structured document linked to by the post) and a desired output value (a classification of an external structured document as either being an external lead-generation type page or an external non-lead-generation type page). A supervised learning algorithm may analyze the training data and produce an inferred function, which can be used for mapping new examples (i.e., new input objects that are not yet classified). As a result of the supervised training, the machine-learning algorithm will be able to accurately determine the class labels for new examples. In particular embodiments, the social-networking system 160 may access a first plurality of posts of the online social network by a first plurality of third-party content providers. Each post of the first plurality of posts may include a link to an external structured document on an external server associated with the respective third-party content provider that has been predetermined as being an external lead-generation type page. The social-networking system 160 may also access a second plurality of posts of the online social network by a second plurality of third-party content providers. Each post of the second plurality of posts may comprise a link to an external structured document on an external server associated with the respective third-party content provider that has been predetermined as being an external non-lead-generation type page. The social-networking system 160 may then retrieve each structured document linked to by each post of the first and second plurality of the posts, where each structured document may include content and input fields. The social-networking system 160 may further extract information about the content and input fields from each of the retrieved structured documents linked to by the first and second plurality of posts and evaluate the extracted information from each of the first and second plurality of the structured documents to determine a plurality of feature-values for each of the retrieved structured documents linked to by the first and second plurality of posts.

The feature-values extracted from each external structured document linked to by the first and second plurality of posts may then be used to train the machine-learning model for predicting whether a given post is used for lead-generation purposes. Any suitable machine-learning model and any suitable training algorithm may be used, such as linear regression, logistic regression, neural networks, nearest neighbor methods, support vector machines, etc. In particular embodiments, a machine-learning model may be represented by a linear combination of weighted features:

$$P = w_1 f_1 + w_2 f_2 + \ldots + w_i f_i$$

where P is a dependent variable representing the structured document's classification as a lead-generation type page or a non-lead-generation type page; $f_1 \ldots f_i$ are dependent variables representing the structured document's feature values, and $w_1 \ldots w_i$, are weights or coefficients for the dependent variables. This machine-learning model may be trained, for example, using linear-regression analysis to determine the proper weights for the features. For example, each structured document may be represented using the equation above by substituting the structured document's classification for the dependent variable P (e.g., P may be set to 1 if the structured document is associated with a post from the first plurality of posts, or 0 if the structured document is associated with a post from the second plurality of posts), and substituting the structured documents' extracted feature values for the independent variables $f_1 \ldots f_i$. With each structured document associated with each post in the first and second plurality of posts represented by the machine-learning model, linear regression may then be used to train the machine-learning model to find the proper values for the weights $w_1 \ldots w_i$.

The trained machine-learning model may be used to predict whether any given structured document belongs to the first or second plurality of posts (e.g., whether the post of the online social network is used for lead-generation purpose or not). For example, a structured document belonging to an unknown category may be analyzed to extract feature-values corresponding to the predetermined information about the input fields and content of the structured document (e.g., the total number of words, the number of input fields PASSWORD). The extracted feature-values may then be input into the machine-learning model. For example, the feature-values may be input as the machine-learning model's independent variables $f_1 \ldots f_i$. By analyzing the feature-values, the machine-learning model is able to predict or classify whether the structured document belongs to the first category or the second category (e.g., used for lead-generation purposes or non-lead-generation purposes). The prediction, which may be represented by P above, may represent a probability or likelihood of how the structured document should be classified. For example, the system may determine that the structured document belongs to the first category if P is above a certain threshold (e.g., 66%), belongs to the second category if P is below a certain threshold (e.g., 33%), and inconclusive otherwise.

In particular embodiments, the social-networking system 160 may send, to the third-party content provider associated with the structured document, a notification if the structured document is classified as an external lead-generation type page and recommending the third-party content provider to use a native lead-generation type post. The notification may include a link to an interface for generating a native lead-generation type post. The native lead-generation type post may be operable to extract social-networking information associated with users from an internal server of the social-networking system 160 and pre-populate one or more fields of the native lead-generation type post with the extracted social-networking information. As an example and not by way of limitation, the social-networking system 160 may send an interface containing the native lead-generation type post associated with the external lead-generation type page to the third-party content provider. As another example and not by way of limitation, the social-networking system 160 may send a link to the native lead-generation type post associated with the external lead-generation type page to the third-party content provider. Although this disclosure describes sending a notification to a third-party content provider in a particular manner, this disclosure contemplates sending a notification to a third-party content provider in any suitable manner.

In particular embodiments, the social-networking system 160 may extract at least a portion of the content and information about the input fields from the structured document and identify social-networking information corresponding to the input fields. In particular embodiments, the social-networking system 160 may generate a native lead-generation type post, in which the native lead-generation type post may include the portion of the content extracted from the structured document and one or more pre-linked input fields. Each pre-linked input field may correspond to an input field from the structured document and be associated with the identified social-networking system 160 information. Each pre-linked input field may be operable to pre-populate the input field with the identified social-networking system 160 information.

In particular embodiments, the social-networking system 160 may generate a native lead-generation type post associated with the external lead-generation type page. The social-networking system 160 may identify one or more native lead-generation type posts associated with one or more other third-party content providers and extract the input fields and content of the identified one or more native lead-generation type post. The social-networking system 160 may generate a native lead-generation type post based on the extracted input fields and content of the identified one or more native lead-generation type post. In particular embodiments, the social-networking system 160 may further identify one or more native lead-generation type posts associated with the third-party content provider, extract the input fields and content of the identified one or more native lead-generation type post, and generate a native lead-generation type post associated with the same third-party content provider based on the extracted input fields and content of the identified one or more native lead-generation type post.

In particular embodiments, the social-networking system 160 may receive, in response to the notification to the third-party content provider, instructions from the third-party content provider to modify the native lead-generation type post. The social-networking system 160 may modify the native lead-generation type post, and post the modified native lead-generation type post on the online social network.

Figure 3:
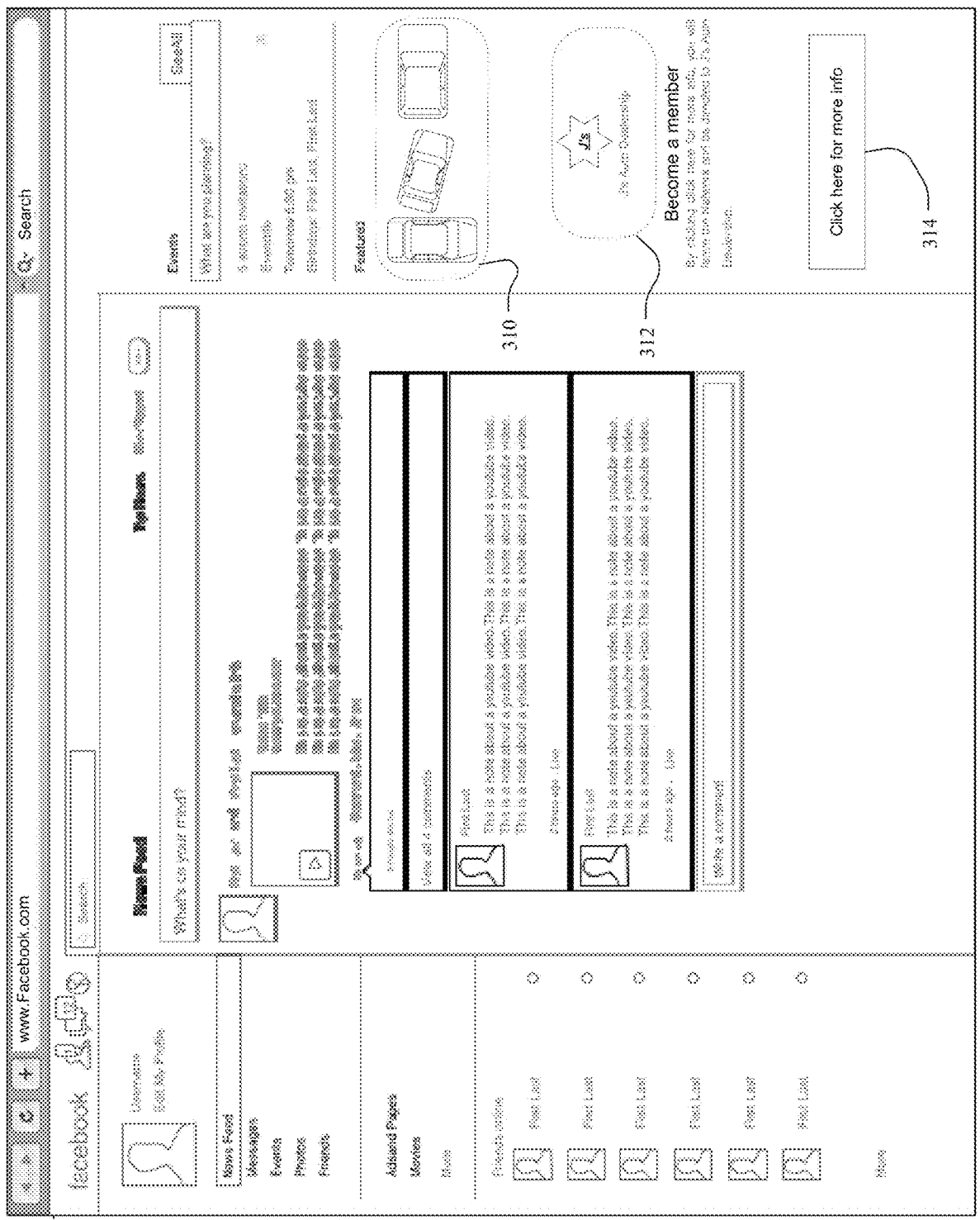
FIG. 3 illustrates an example of a post on the online social network linking to an external lead-generation type page.

FIG. 3 illustrates an example of a post on the online social network linking to an external lead-generation type page. The post may include a picture 310 and a logo 312 associated with the third-party content provider. The viewing user may click on a button 314 to access a structured document associated with the post on the social-networking system 160. As an example and not by way of limitation, a post may be associated with an auto dealership ("J's Auto Dealership") and include a button 314 to direct the viewing user to the auto dealership's webpage for information regarding the products and services offered by the auto dealership.

Figure 4:
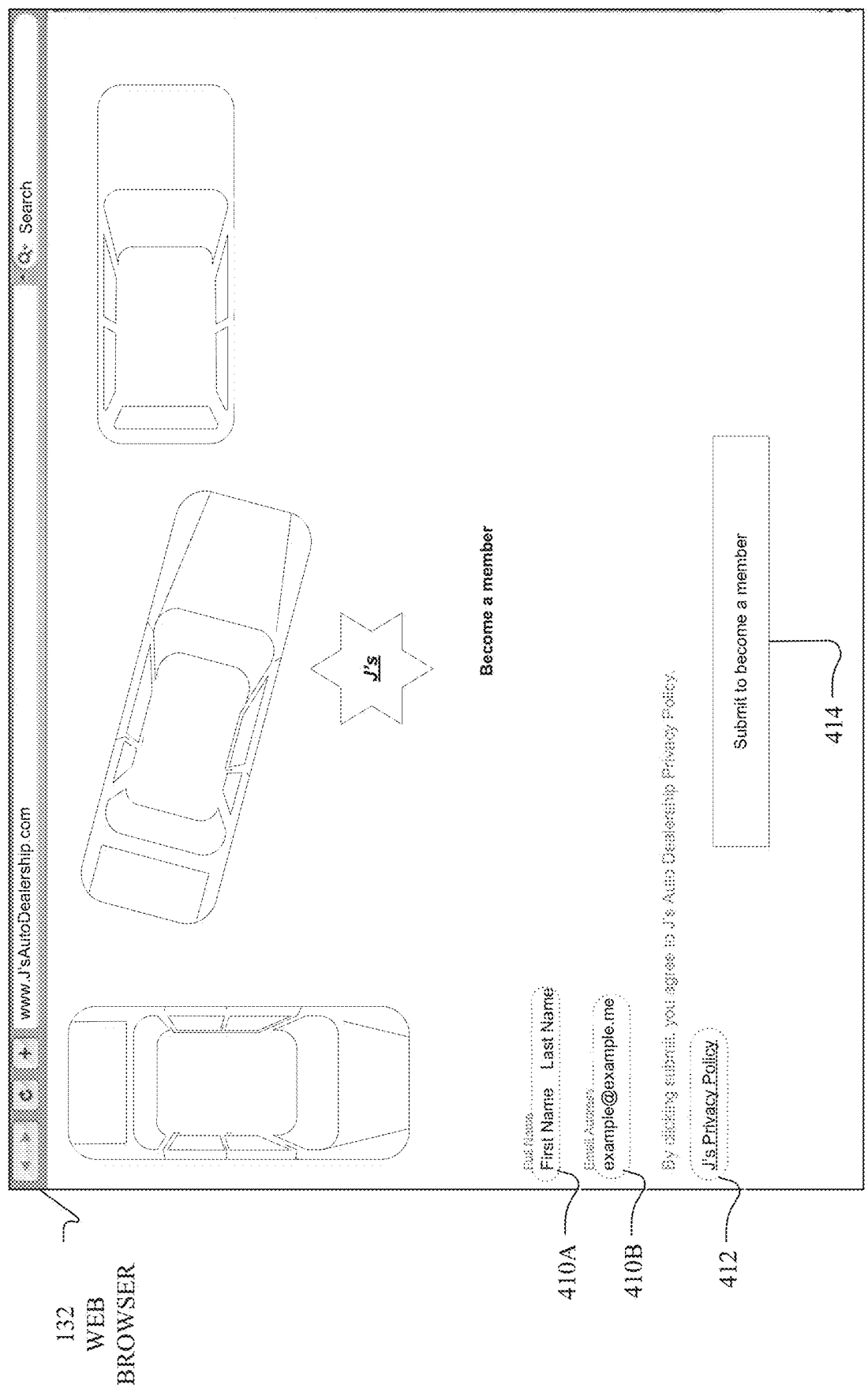
FIG. 4 illustrates an example of an external lead-generation type page linked to by a post of the online social network.

FIG. 4 illustrates an example of an external lead-generation type page linked to by a post of the online social network. The external structured document may be hosted on an external server and accessed by a web browser 132. For example, the user clicking on the "Click here for more info" button 314 on the post of the abovementioned example may result in retrieving a webpage as shown in FIG. 4. The external structured document associated with the external lead-generation type page may include one or more input fields. As an example, referencing FIG. 4, the input fields may include full name 410A and email address 410B of the viewing user. Owing to the fact that the structured document may be hosted on an external server, the input fields may not be pre-populated by the social-networking system 160. The user may access the privacy policy 412 associated with the third-party content provider though a link on the structured document. The user may be required to manually populate the input fields and submit 414 his/her information.

Figure 5:
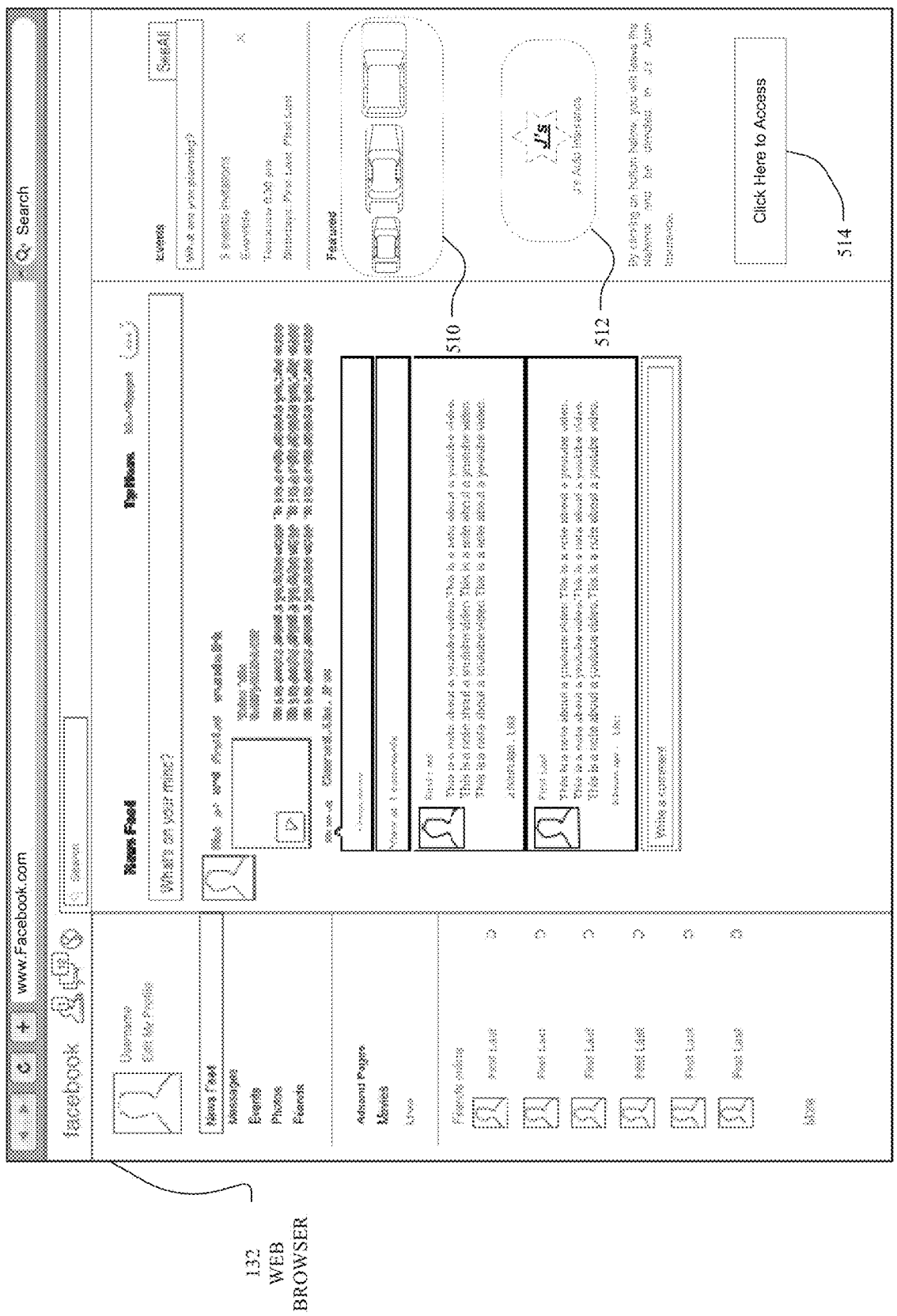
FIG. 5 illustrates an example of a post on the online social network linking to an external non-lead-generation type page.

FIG. 5 illustrates an example of a post on the online social network linking to an external non-lead-generation type page. The post may include a picture 510 and a logo 512 associated with the third-party content provider. The viewing user may click on a button 514 to access a structured document associated with the post on the social-networking system 160. As an example and not by way of limitation, a post may be associated with an auto insurance company and include a button 514 to direct the viewing user to the auto insurance's webpage for information regarding the products and services offered by the auto insurance.

Figure 6:
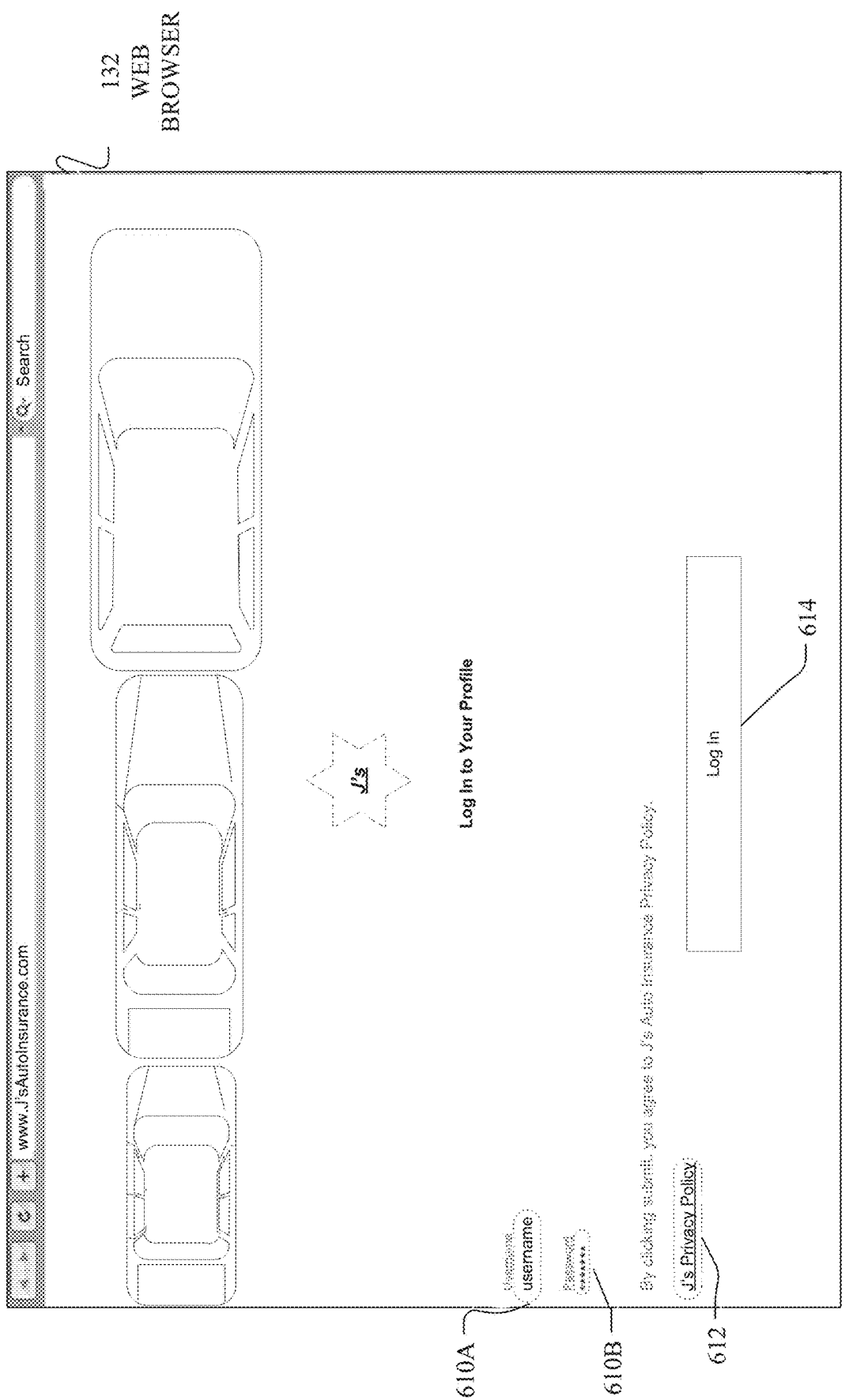
FIG. 6 illustrates an example of an external non-lead-generation type page linked to by a post of the online social network.

FIG. 6 illustrates an example of an external non-lead-generation type page linked to by a post of the online social network. The external structured document may be hosted on an external server and accessed by a web browser 132. For example, the user clicking on the "Click here to Access" button 514 on the post of the abovementioned example may result in retrieving an authentication web interface as shown in FIG. 6. The authentication web interface associated with the post may include one or more input fields. As an example, the input fields may include full name 610A and password 610B of the viewing user. Owing to the fact that the authentication web interface may be hosted on an external server, the input fields may not be pre-populated by the social-networking system 160. The user may access the privacy policy 612 associated with the third-party content provider though a link on the authentication web interface. The viewing user may be required to populate the input fields to log in 614 to his/her web interface.

Figure 7:
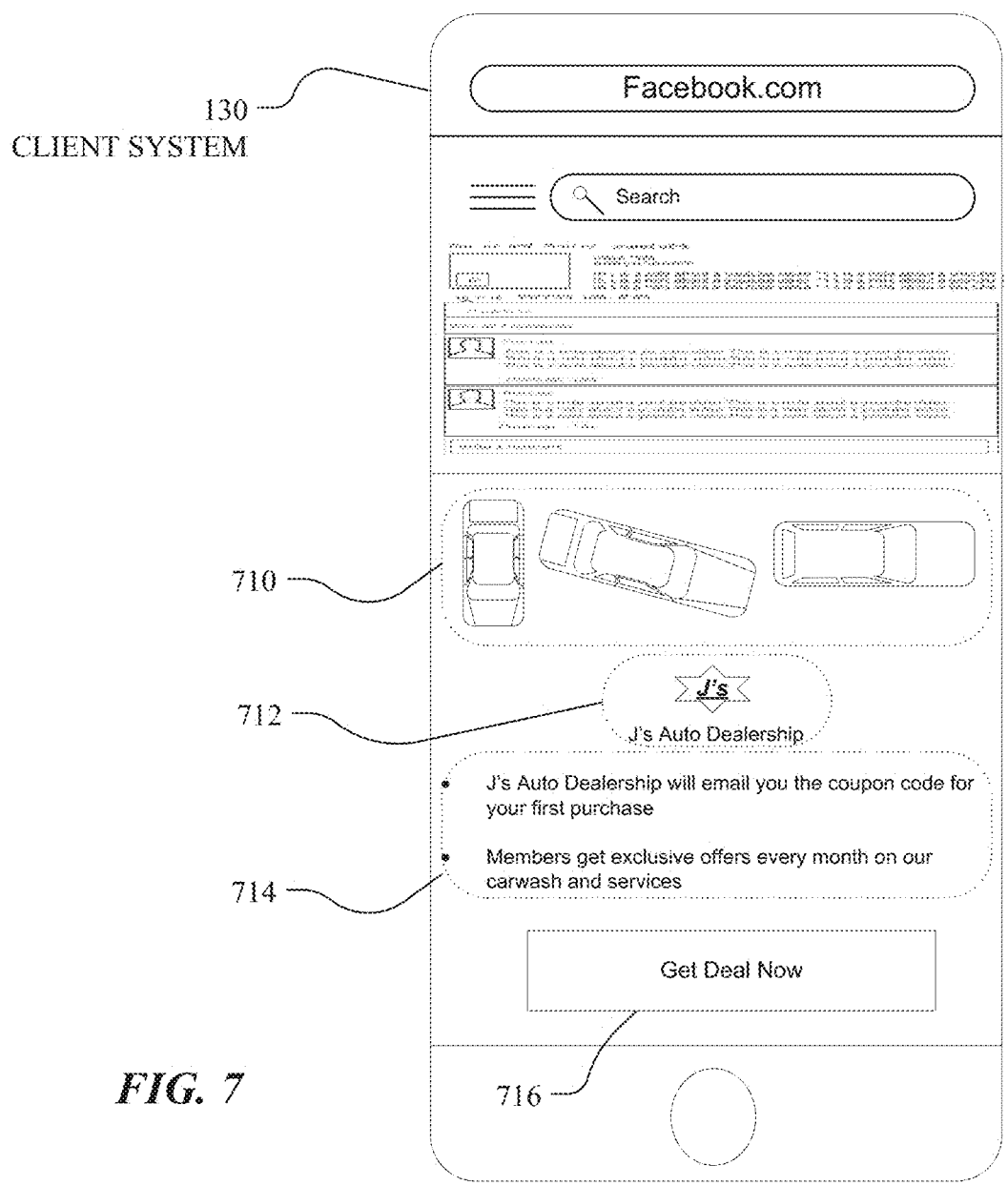
FIG. 7 illustrates an example of a first interface of a native lead-generation type post on the online social network.

FIGS. 7-10 illustrate a series of example interfaces of a native lead-generation type post on a client system 130. The native lead-generation type post may include one or more interfaces. FIG. 7 illustrates an example of a first interface of a native lead-generation type post on the online social network. As depicted in FIG. 7, the first interface may include a picture 710 and a logo 712 of the third-party content provider. Further, there may be an information section including a text string 714 associated with the third-party content provider. As an example and not by way of limitation, a lead-generation type post may be associated with an auto dealership, as the third-party content provider, and the information section 714 may include one or more benefits of signing up to the auto dealership website. The viewing user may click on the button 716 on the first interface to be directed to the second interface.

Figure 8:
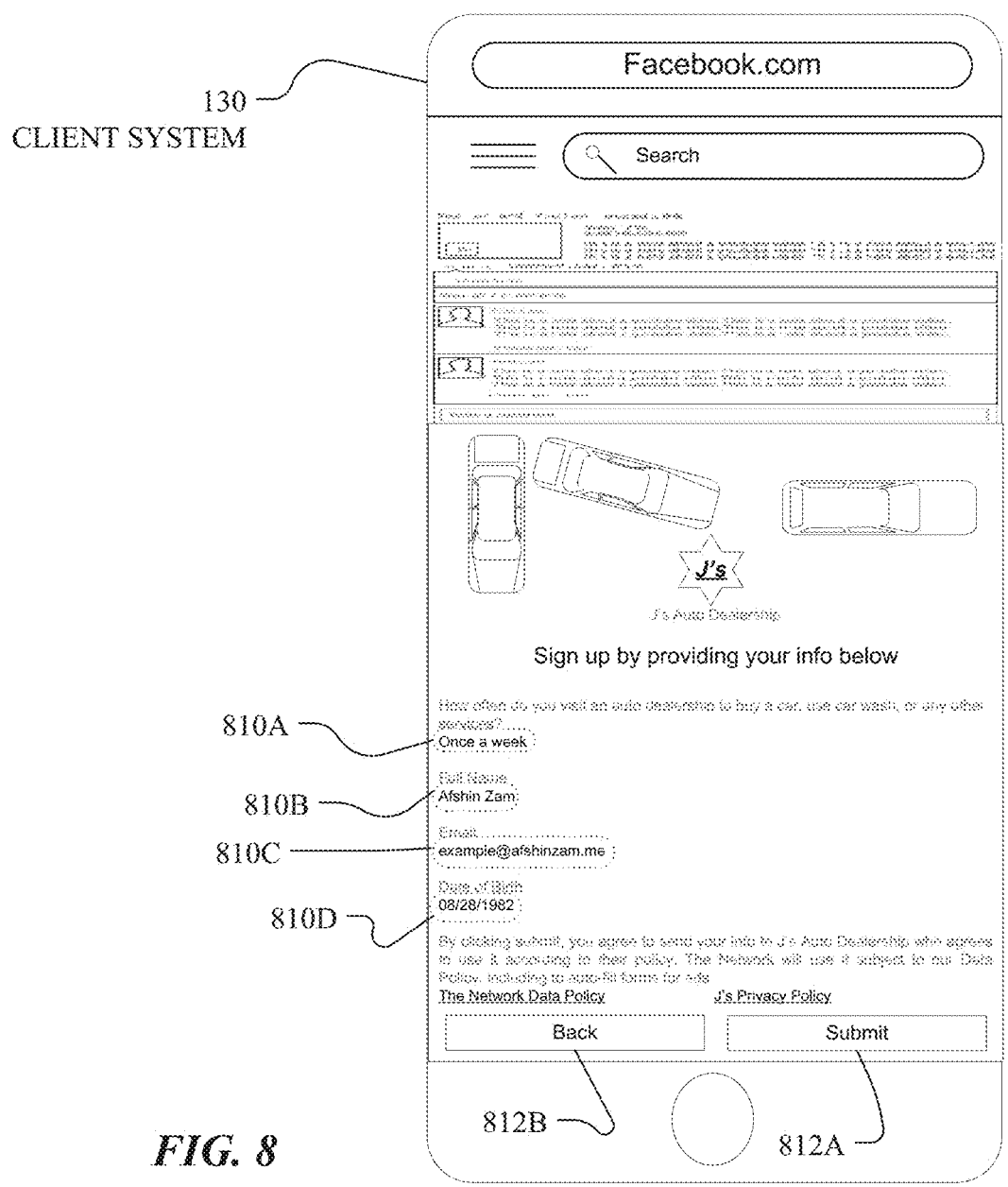
FIG. 8 illustrates an example of a second interface of a native lead-generation type post on the online social network.

FIG. 8 illustrates a second interface of the native lead-generation type post on the online social network. The second interface of the native lead-generation type post may include a picture and a logo associated with the third-party content provider. The native lead-generation type post may ask for the viewing user information. As an example and not by way of limitation, the second interface of the native lead-generation type post, associated with the auto dealership of abovementioned example, may require the viewing user to populate input fields including the frequency the user visit an auto dealership to buy a car, accessing car wash or any other car services 810A, full name 810B, email address 810C and date of birth 810D. The user information stored in a data store 164 of the social-networking system 160 may be used to pre-populate the input fields full name 810B, email address 810C and date of birth 810D (possibly subject to the user's privacy settings). The viewing user may choose to scroll between the native lead-generation type post interfaces by clicking on the submit button 812A and back button 812B.

Figure 9:
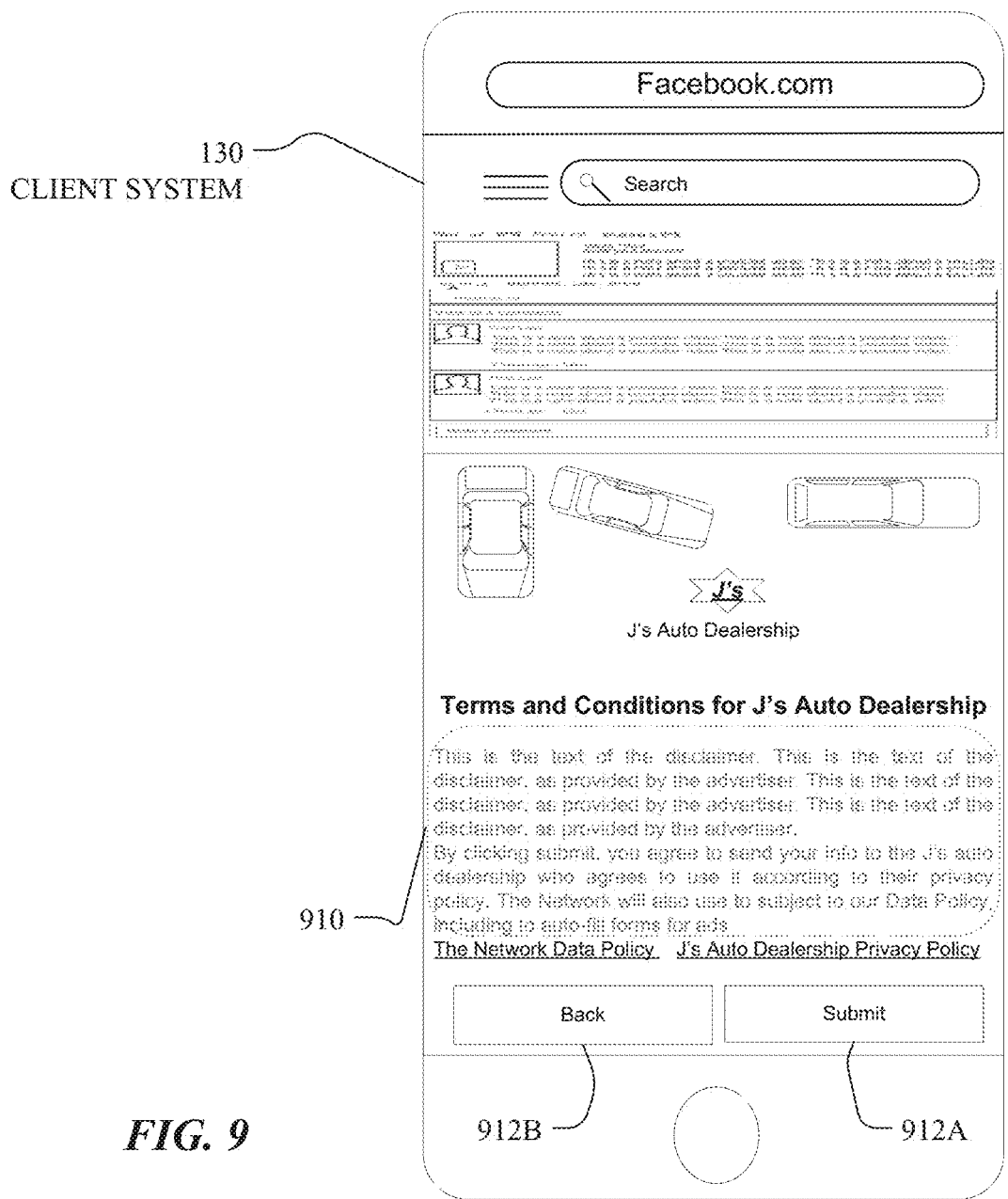
FIG. 9 illustrates an example of a third interface of a native lead-generation type post on the online social network.

FIG. 9 illustrates a third interface of the native lead-generation type post on the online social network. The third interface of the native lead-generation type post may include a picture and a logo associated with the third-party content provider. As an example and not by way of limitation, the third interface of the native lead-generation type post, associated with the auto dealership of abovementioned example, may further include terms and conditions 910 associated with the third-party content provider. The user may choose to scroll between the native lead-generation type post interfaces by clicking on the submit button 912A and back button 912B.

Figure 10:
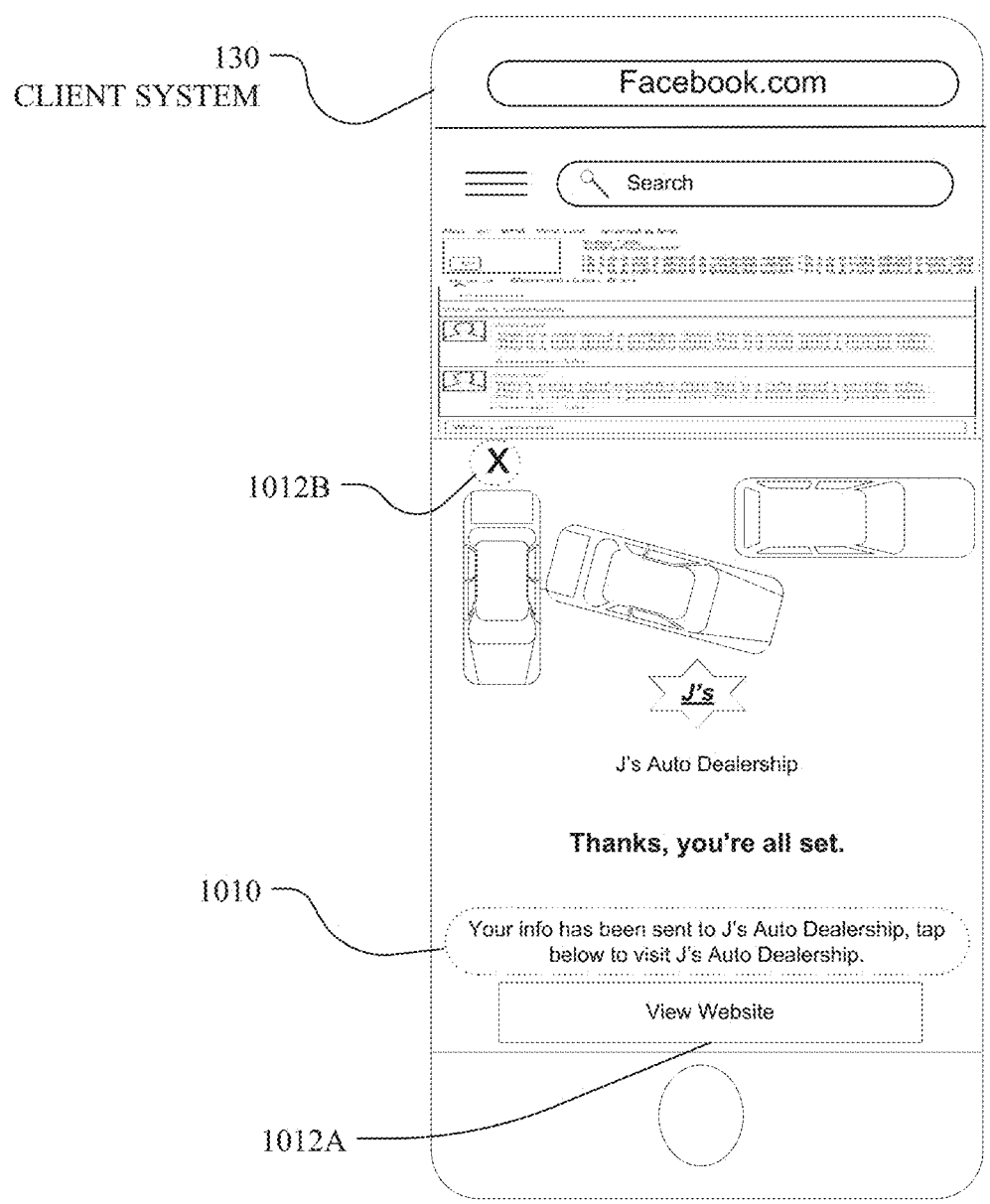
FIG. 10 illustrates an example of a fourth interface of a native lead-generation type post on the online social network.

FIG. 10 illustrates a fourth interface of the native lead-generation type post on the online social network. The fourth interface of the native lead-generation type post may include a picture and a logo associated with the third-party content provider. As an example and not by way of limitation, the fourth interface of the native lead-generation type post, associated with the auto dealership of abovementioned example, may include a text string 1010 confirming that the viewing user's information is being sent to the third-party content provider. In this example, the user's information will not be sent to the third-party content provider until the user confirms that such information may be sent. In other words, the native lead-generation type post does not allow the third-party content provider to automatically access the user's information without the user's permission. The user may choose to visit the third-party content provider's web interface on an external server by clicking on the button 1012A or close the window by clicking on the "x" button 1012B.

Figure 11:
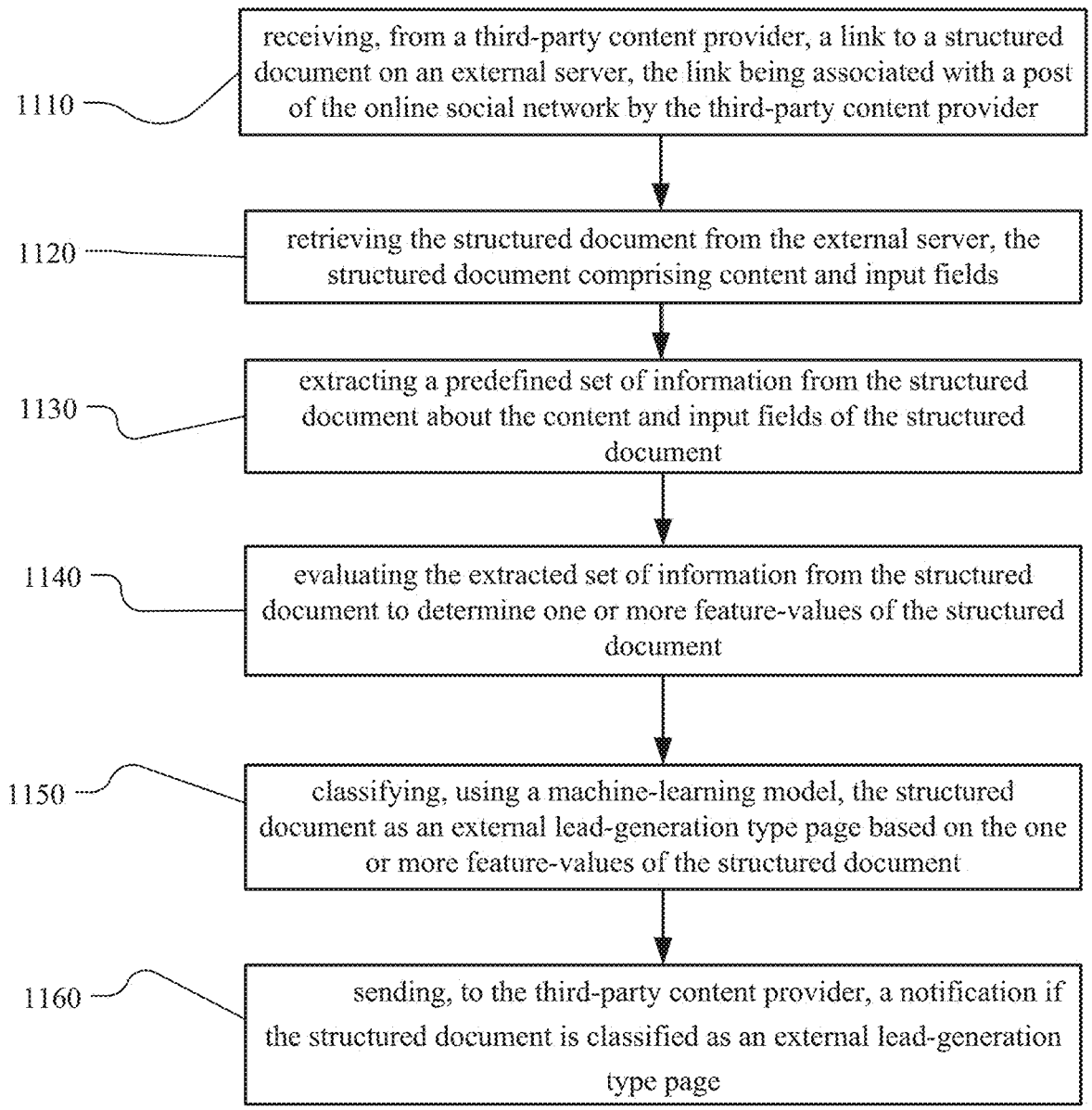
FIG. 11 illustrates an example method for classifying posts on the online social network.

FIG. 11 illustrates an example method 1100 for classifying posts on the online social network. The method may begin at step 1110, where the social-networking system 160 may receive, from a third-party content provider, a link to a structured document on an external server, the link being associated with a post of the online social network by the third-party content provider. At step 1120, the social-networking system 160 may retrieve the structured document from the external server. The structured document may comprise content and input fields. At step 1130, the social-networking system 160 may extract a predefined set of information from the structured document about the content and input fields of the structured document. At step 1140, the social-networking system 160 may evaluate the extracted set of information from the structured document to determine one or more feature-values of the structured document. At step 1150, the social-networking system 160 may classify, using a machine-learning model, the structured document as an external lead-generation type page based on the one or more feature-values of the structured document. At step 1160, the social-networking system 160 may send, to the third-party content provider, a notification if the structured document is classified as an external lead-generation type page. Particular embodiments may repeat one or more steps of the method of FIG. 11, where appropriate.

Although this disclosure describes and illustrates particular steps of the method of FIG. 11 as occurring in a particular order, this disclosure contemplates any suitable steps of the method of FIG. 11 occurring in any suitable order. Moreover, although this disclosure describes and illustrates an example method for classifying posts on online social networks including the particular steps of the method of FIG. 11, this disclosure contemplates any suitable method for classifying posts on online social networks including any suitable steps, which may include all, some, or none of the steps of the method of FIG. 11, where appropriate. Furthermore, although this disclosure describes and illustrates particular components, devices, or systems carrying out particular steps of the method of FIG. 11, this disclosure contemplates any suitable combination of any suitable components, devices, or systems carrying out any suitable steps of the method of FIG. 11.

Advertising

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more web interfaces, in one or more e-mails, or in connection with search results requested by a user. In addition or as an alternative, an advertisement may be one or more sponsored stories (e.g., a news-feed or ticker item on the social-networking system 160). A sponsored story may be a social action by a user (such as "liking" an interface, "liking" or commenting on a post on an interface, RSVPing to an event associated with an interface, voting on a question posted on an interface, checking in to a place, using an application or playing a game, or "liking" or sharing a website) that an advertiser promotes, for example, by having the social action presented within a pre-determined area of a profile interface of a user or other interface, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results interface, where sponsored content is promoted over non-sponsored content.

In particular embodiments, an advertisement may be requested for display within social-networking-system web interfaces, third-party web interfaces, or other interfaces. An advertisement may be displayed in a dedicated portion of an interface, such as in a banner area at the top of the interface, in a column at the side of the interface, in a GUI within the interface, in a pop-up window, in a drop-down menu, in an input field of the interface, over the top of content of the interface, or elsewhere with respect to the interface. In addition or as an alternative, an advertisement may be displayed within an application. An advertisement may be displayed within dedicated interfaces, requiring the user to interact with or watch the advertisement before the user may access an interface or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) an interface associated with the advertisement. At the interface associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, the social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through the social-networking system 160) or RSVP (e.g., through the social-networking system 160) to an event associated with the advertisement. In addition or as an alternative, an advertisement may include social-networking-system content directed to the user. As an example and not by way of limitation, an advertisement may display information about a friend of the user within the social-networking system 160 who has taken an action associated with the subject matter of the advertisement.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile profile interface that identify a set of users that may access the work experience information on the user-profile interface, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by the social-networking system 160 or shared with other systems (e.g., a third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 12:
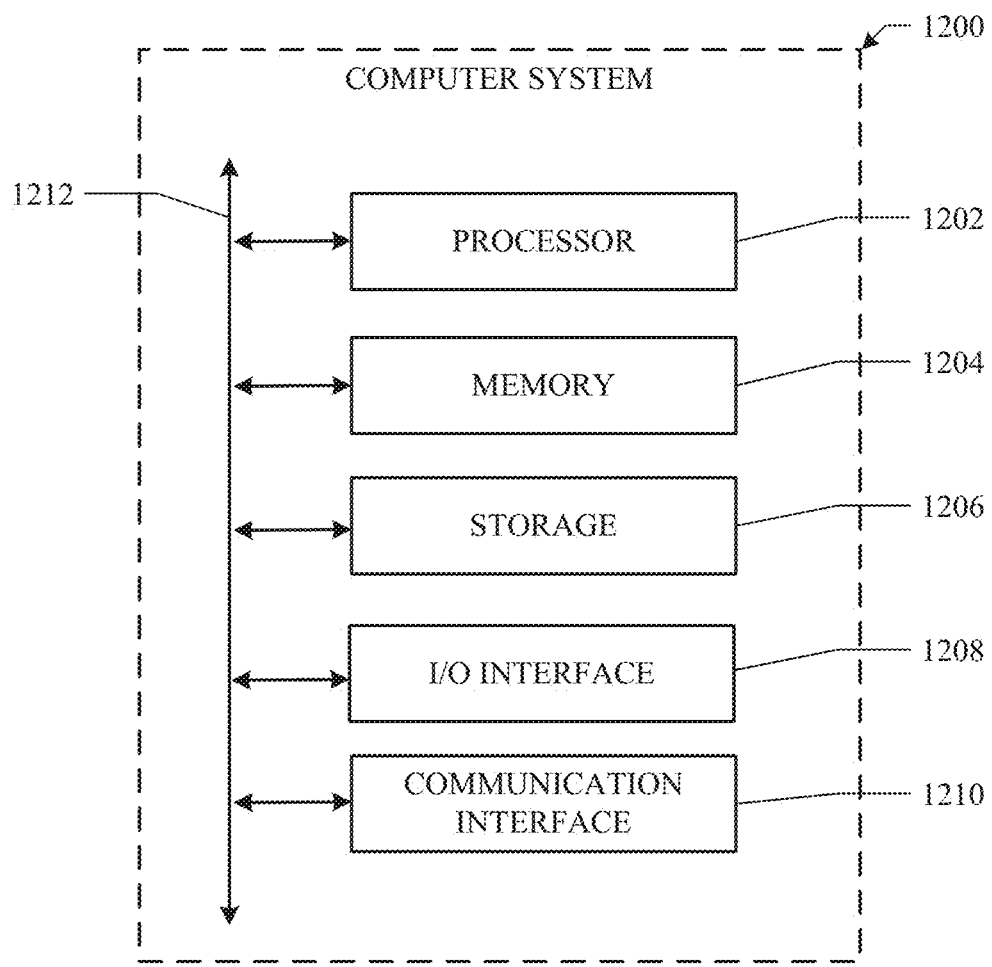
FIG. 12 illustrates an example computer system.

FIG. 12 illustrates an example computer system 1200. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 908, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing devices of an online social network:
    receiving, by the one or more computing devices from a third-party content provider, a link to a structured webpage document on an external server that is external to the online social network, via a first graphical user interface of the online social network, the link being associated with a post of the online social network by the third-party content provider;
    retrieving, by the one or more computing devices, the structured webpage document from the external server, the structured webpage document comprising content and one or more input fields in a graphical user interface of the structured webpage document;
    extracting, by the one or more computing devices from the structured webpage document, a set of information of the content and of the one or more input fields of the structured webpage document;
    evaluating, by the one or more computing devices, the extracted set of information from the structured webpage document to determine one or more feature-values of the structured webpage document;
    automatically classifying, by the one or more computing devices using a machine-learning model, comprising one or more of a neural network or a support vector machine, and based on the determined one or more feature-values, the structured webpage document as an external lead-generation type webpage;
    sending, by the one or more computing devices to the third-party content provider responsive to determining that the machine-learning model has classified the structured webpage document as an external lead-generation type webpage, a notification comprising instructions for creating an internal lead-generation type post on the online social network corresponding to the external lead-generation type webpage, wherein the internal lead-generation type post is operable to extract social-networking information associated with users from an internal server of the online social network; and
    creating, by the one or more computing devices, the internal lead generation type post on the online social network corresponding to the external lead-generation type webpage with the first graphical user interface of the online social network or a second graphical user interface of the online social network, wherein the one or more fields of the internal lead-generation type post are auto-populated with the extracted social-networking information and correspond respectively to the one or more input fields of the structured webpage document from the external server.

2. The method of claim 1, wherein the machine-learning model is trained by:
    accessing a first plurality of posts of the online social network by a first plurality of third-party content providers, wherein each post of the first plurality of posts comprises a link to a structured webpage document on an external server associated with the respective third-party content provider, each post of the first plurality of posts being predetermined as linking to an external lead-generation type page;
    accessing a second plurality of posts of the online social network by a second plurality of third-party content providers, wherein each post of the second plurality of posts comprises a link to a structured webpage document on an external server associated with the respective third-party content provider, each post of the second plurality of posts being predetermined as linking to an external non-lead-generation type page;
    retrieving each structured webpage document linked to by each post of the first and second plurality of the posts, each structured webpage document comprising content and input fields;
    extracting information about the content and input fields from each of the retrieved structured webpage documents linked to by the first and second plurality of posts; evaluating the extracted information from each of the first and second plurality of the structured webpage documents to determine a plurality of feature-values for each of the retrieved structured webpage documents linked to by the first and second plurality of posts; and
    training the machine-learning model using the plurality of feature-values of the retrieved structured webpage documents linked to by the first and second plurality of posts;
    wherein the trained machine-learning model is configured to predict whether a particular structured webpage document on an external server linked to by a particular post on the online social network is an external lead-generation type page or an external non-lead-generation type page based on one or more feature-values determined for the particular structured webpage document linked to by the particular post.

3. The method of claim 1, wherein one of the feature-values is a content of the one or more input fields in the structured webpage document.

4. The method of claim 1, wherein one of the feature-values is a number of the one or more input fields in the structured webpage document.

5. The method of claim 1, wherein one of the feature-values is a number of the one or more input fields accessible to a user in the structured webpage document.

6. The method of claim 1, wherein one of the feature-values is a number of words or html elements in the structured webpage document.

7. The method of claim 1, wherein automatically classifying the structured webpage document using the machine-learning model comprises:
calculating a confidence score for the structured webpage document based on the one or more feature-values of the structured webpage document; and
assigning a classification to the structured webpage document based on the calculated confidence score, wherein if the calculated confidence score is greater than a predefined threshold score, the classification of the structured webpage document indicates an external lead-generation type page.

8. The method of claim 1, wherein automatically classifying the structured webpage document using the machine-learning model occurs responsive to the link being received by the online social network from the third-party content provider.

9. The method of claim 1, wherein automatically classifying the structured webpage document using the machine-learning model occurs at a predefined time period after the link is received by the online social network from the third-party content provider.

10. The method of claim 1, wherein the notification comprises an interface containing the internal lead-generation type post.

11. The method of claim 1, further comprising generating the internal lead-generation type post for the third-party content provider based on respective content and input fields of one or more native lead-generation type posts.

12. The method of claim 11, wherein generating the internal lead-generation type post comprises:
identifying one or more native lead-generation type posts associated with one or more other content providers;
identifying one or more native lead-generation type posts associated with the third-party content provider;
extracting the respective input fields and content of the identified one or more native lead-generation type posts; and
generating the internal lead-generation type post based on the respective extracted input fields and content of the identified one or more native lead-generation type post.

13. The method of claim 12, further comprising:
receiving instructions from the third-party content provider to modify the internal lead-generation type post; and
posting the modified internal lead-generation type post on the online social network.

14. The method of claim 1, further comprising generating the internal lead-generation type post for the third-party content provider based on the content and the one or more input fields of the structured webpage document.

15. The method of claim 14, further comprising:
extracting at least a portion of the set of information from the structured webpage document;
identifying social-networking information corresponding to the one or more input fields;
generating the internal lead-generation type post, wherein the internal lead generation type post comprises the portion of the content extracted from the structured webpage document and one or more pre-linked input fields, each pre-linked input field corresponding to an input field from the structured webpage document and being associated with the identified social-networking information, each pre-linked input field being operable to pre-populate the input field with the identified social-networking information.

16. The method of claim 15, further comprising:
receiving instructions from the third-party content provider to modify the internal lead-generation type post; and
posting the modified internal lead-generation type post on the online social network.

17. One or more computer-readable non-transitory storage media embodying software that is operable when executed to:
receive, by one or more computing devices from a third-party content provider, a link to a structured webpage document on an external server that is external to the online social network, via a first graphical user interface of the online social network, the link being associated with a post of the online social network by the third-party content provider;
retrieve, by the one or more computing devices, the structured webpage document from the external server, the structured webpage document comprising content and one or more input fields in a graphical user interface of the structured webpage document;
extract, by the one or more computing devices from the structured webpage document, a set of information of the content and of the input fields of the structured webpage document; evaluate, by the one or more computing devices, the extracted set of information from the structured webpage document to determine one or more feature-values of the structured webpage document;
automatically classify, by the one or more computing devices using a machine-learning model, comprising one or more or a neural network or a support vector machine, and based on the determined one or more feature-values, the structured webpage document as an external lead-generation type webpage;
send, to the third-party content provider responsive to determining that the machine-learning model has classified the structured webpage document as an external lead-generation type webpage, a notification comprising instructions for creating an internal lead-generation type post on the online social network corresponding to the external lead-generation type webpage, wherein the internal lead-generation type post is operable to extract social-networking information associated with users from an internal server of the online social network and auto-populate one or more fields of the internal lead-generation type post with the; and
create, by the one or more computing devices, the internal lead generation type post on the online social network corresponding to the external lead-generation type webpage with the first graphical user interface of the online social network or a second graphical user interface of the online social network, wherein the one or more fields of the internal lead-generation type post are auto-populated with the extracted social-networking information and correspond respectively to the one or more input fields of the structured webpage document from the external server.

18. A system comprising: one or more processors; and a non-transitory memory coupled to the processors comprising instructions executable by the processors, the processors operable when executing the instructions to:
receive, by one or more computing devices from a third-party content provider, a link to a structured webpage document on an external server that is external to the online social network, via a first graphical user interface of the online social network, the link being associated with a post of the online social network by the third-party content provider;

retrieve, by the one or more computing devices, the structured webpage document from the external server, the structured webpage document comprising content and one or more input fields in a graphical user interface of the structured webpage document;

extract, by the one or more computing devices from the structured document, a set of information of the content and of the input fields of the structured document;

evaluate, by the one or more computing devices, the extracted set of information from the structured webpage document to determine one or more feature-values of the structured webpage document;

automatically classify, by the one or more computing devices using a machine-learning model, comprising one or more of a neural network or a support vector machine, and based on the determined one or more feature-values, the structured webpage document as an external lead-generation type webpage;

send, by the one or more computing devices to the third-party content provider responsive to determining that the machine-learning model has classified the structured webpage document as an external lead-generation type webpage, a notification comprising instructions for creating an internal lead-generation type post on the online social network corresponding to the external lead-generation type webpage, wherein the internal lead-generation type post is operable to extract social-networking information associated with users from an internal server of the online social network; and create, by the one or more computing devices, the internal lead generation type post on the online social network corresponding to the external lead-generation type webpage with the first graphical user interface of the online social network or a second graphical user interface of the online social network, wherein the one or more fields of the internal lead-generation type post are auto-populated with the extracted social-networking information and correspond respectively to the one or more input fields of the structured webpage document from the external server.

* * * * *